Patented Nov. 21, 1922.

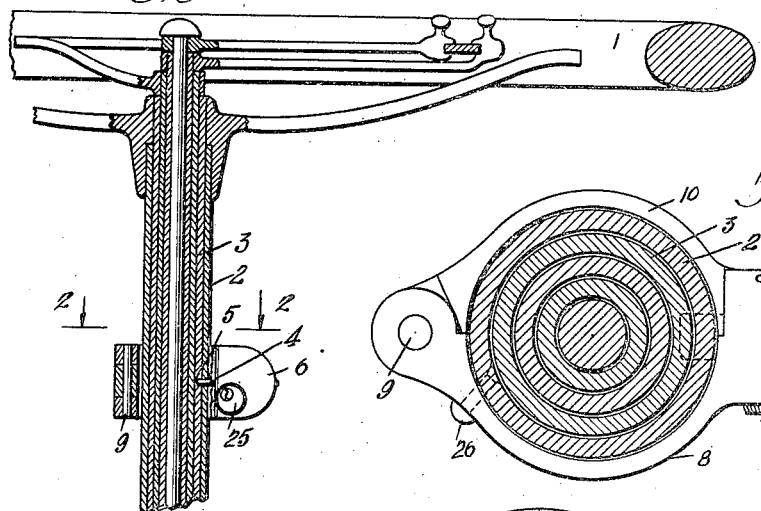
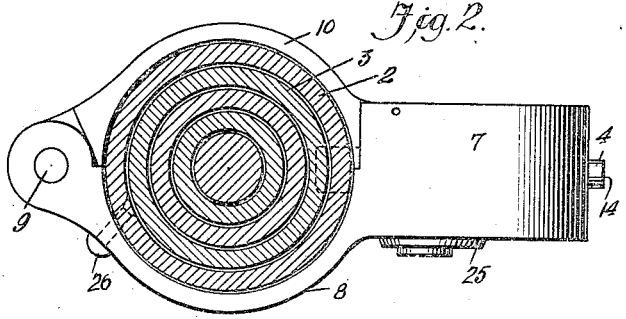
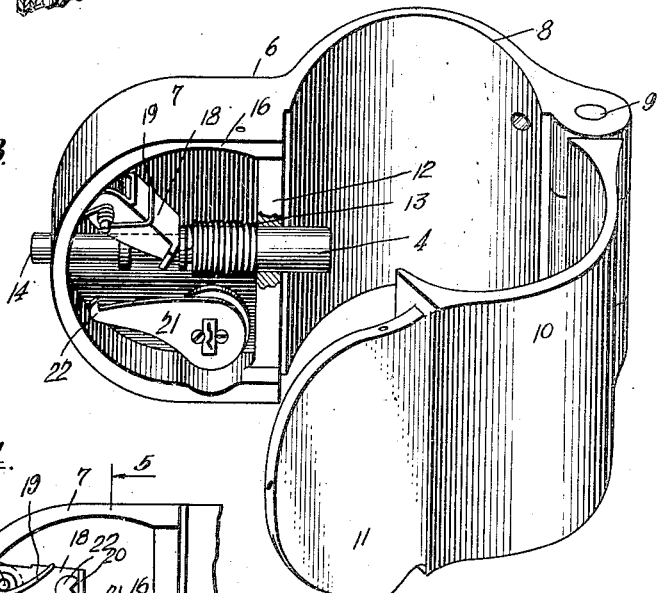
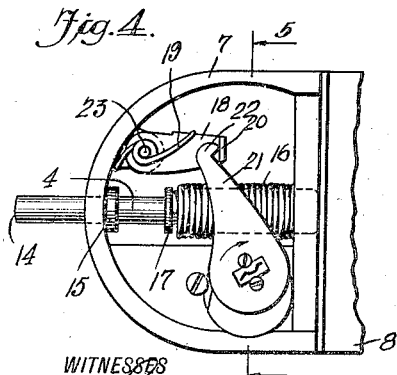
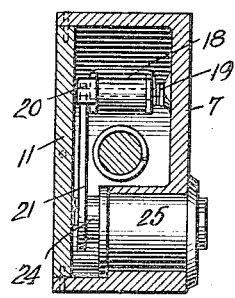

1,436,585

UNITED STATES PATENT OFFICE.

JAMES CORNELL GAYNOR, OF PATERSON, NEW JERSEY.

AUTOMOBILE LOCK.

Application filed September 23, 1920. Serial No. 412,340.

*To all whom it may concern:*

Be it known that I, JAMES C. GAYNOR, a citizen of the United States, and a resident of Paterson, in the county of Passaic and State of New Jersey, have invented a new and Improved Automobile Lock, of which the following is a full, clear, and exact description.

This invention relates to automobile locks and has for an object to provide an improved construction designed to be applied to the steering post in such a manner as to be locked merely by pressure of the hand.

Another object of the invention is to provide a lock wherein spring means are utilized for automatically moving the locking bolt to an unlocked position in case of disarrangement or jarring loose of any of the locking mechanism.

A still further object of the invention is to provide an improved lock capable of easy application to a steering post of an automobile and wherein the locking means is easily applied or moved to a locking position manually while a special key is necessary for moving the bolt to an unlocked position.

In the accompanying drawing:

Figure 1 is a fragmentary sectional view through a steering post wheel and associated parts disclosing an embodiment of the invention applied thereto.

Figure 2 is a sectional view to Figure 1 on line 2—2, the same being on an enlarged scale.

Figure 3 is a perspective view of the lock shown in Figure 2, certain parts being disclosed on a disengaged or open position for better illustrating the locking mechanism.

Figure 4 is a front view of the locking mechanism with the front plate removed and the bolt shown in an unlocked position.

Figure 5 is a sectional view through Figure 4, the same being taken on line 5—5.

Referring to the accompanying drawing by numerals, 1 indicates a steering wheel for an automobile, said wheel being mounted on the steering column 2 in a desired manner, said column 2 being of course held stationary by its mounting in the automobile body. In the column 2 are arranged a number of parts which are common to steering posts, said parts including the steering sleeve 3 which is rigidly secured to the wheel 1, said sleeve being connected in a suitable manner with the front wheels of the automobile for turning the same. In order to lock the wheels against turning during the steering action, means have been provided locking the steering sleeve 3, said means including a reciprocating bolt 4 adapted to be forced into a depression 5 in sleeve 3, said bolt also passing through the stationary post 2. The parts are illustrated in Figure 1 in the position just described and effectively prevent any turning of the steering wheel 1 or any parts operated thereby.

In Figures 2 to 5 inclusive will be seen a detail construction of the lock 6 which includes the bolt 4. This lock is provided with a casing 7 merging into a clamping section 8 hinged at 9 to an auxiliary section 10. The connection between these two sections is preferably a hinged structure so that the lock may be quickly and easily applied at any time. The shape of these clamping sections may be varied to fit different shaped posts without departing from the spirit of the invention and without changing the principle of operation and the mechanism in casing 7. The auxiliary clamping member 10 is provided with an extension 11 which acts as a covering plate for casing 7 and is held in place by rivets or other suitable means when the parts have been properly assembled and the lock applied to a steering post.

It will be noted that the casing 7 is provided with a division plate 12, which plate is formed with an aperture 13 through which the bolt 4 projects. This bolt also projects through a suitable opening in the casing 7 so that the end 14 may be pressed manually at any time from moving the parts from the position shown in Figure 4 to the position shown in Figure 3. A sleeve 15 is connected in any suitable manner or formed integral with the bolt 4 so as to limit the outward or unlocking movement of the bolt, which movement is caused by spring 16 surrounding part of the bolt and pressing against the division wall 12 and against a second sleeve or stop 17 connected with or formed integral with the bolt 4.

When the parts are unlocked the spring 16 will hold the bolt in position shown in Figure 4 but when the parts have been moved to a locked position as shown at Figure 3 by pressing end 14 manually, spring 16 will be compressed and a locking pawl 18 will move under the action of spring 19 over until it rests on stop 17 and thereby prevent a return of the bolt 4.

The pawl 18 is preferably U-shape in cross section and is provided with a flange 20 adapted to engage the cam 21 and also at certain times the hook end 22. The pawl 18 is pivotally mounted on journal member 23 which may be formed integral with the casing 7 or may be formed independently and connected therewith and also fitted in a suitable socket in the plate or extension 11. The cam 21 is connected with the sleeve 24 of a tumbler lock 25 of any desired construction. This lock is of course operated by a key and when so operated moves the cam 21 in the direction indicated by the arrow in Figure 4 and by such operation presses against the flange 20 and forces the pawl 18 off of the sleeve 17 where upon spring 16 automatically and quickly moves the bolt 4 from the position shown in Figure 3 to the position shown in Figure 4, which latter position is an unlocked position. This action withdraws the bolt 4 from engagement with sleeve 3 and permits the steering wheel 1 to freely shift the front wheels during the usual steering action.

It will be noted that the bolt 4 is moved to a locked position against the action of spring 16. This is of advantage because the spring will automatically move the bolt 4 to an unlocked position in case pawl 18 should be jarred loose or jarred to a position out of engagement with the stop 17. By this construction, the lock will automatically move to an unlocked position in case it should get out of order.

As shown in Figure 1 the lock 6 is applied to the steering post at a point very convenient to the operator or driver and the structure is such that the driver may quickly move the parts to a locked position without the use of a key, though the key is necessary to move the parts to an unlocked position.

In the drawing only one aperture or notch 5 has been provided in the sleeve 3 but it is evident that more could be provided without departing from the spirit of the invention and that the front wheels could be locked pointing straight ahead or locked pointing at an angle in either direction according to the location of the apertures 5.

In applying the lock to the steering post the same may be merely clamped tightly in position thereon or if preferred one or more rivets 26 could be used, said rivets extending through the part of the steering post and through part of the clamping member 8.

What I claim is:

1. In a lock for automobile steering posts, a casing encircling the steering posts comprising two sections hinged together, one section terminating in a semi-circular box-shaped portion and the other in a cover for said box, a manually locked bolt arranged within said box with both ends projecting through opposite walls of said box, a collar secured to said bolt intermediate its ends, a spring surrounding said bolt and arranged between said collar and one wall of said box, said spring actuating said bolt and normally forcing the same in an unlocked position, a spring-pressed swinging pawl arranged in said casing and adapted to engage said collar when said pawl is moved into a locked position, and a hook pointed member also pivoted within said casing adapted to engage said pawl to cause the same to disengage said collar, whereby said bolt is permitted to return to its unlocked position.

2. In a lock for automobile posts, the combination of a steering column provided with a tubular wall having a hole therethrough, a steering post revolubly set within said steering column, a casing formed in two sections hingedly connected together, each of said sections presenting an extended portion, one of said portions being formed in a compartment opened at one side, the other portion being formed in a cover for said compartment, a manually pressed bolt arranged in said compartment, a collar secured to said bolt, said bolt being adapted to be received in said hole of the steering column, a swinging spring actuated bolt arranged in said casing adjacent said bolt for detachably engaging said collar and thereby holding the bolt in a locked position, a spring actuating said bolt for shifting the same in its unlocked position, and a key operated swinging arm also arranged in said compartment adapted to engage said pawl to permit said bolt to withdraw from said hole and unlock the steering post.

JAMES CORNELL GAYNOR.